United States Patent
Phillips et al.

[15] 3,659,899
[45] May 2, 1972

[54] DUMP SYSTEM

[72] Inventors: Ralph L. Phillips, 226 East 3rd South, Apt. #32, Salt Lake City, Utah 84111; John L. Ballou, 5891 South 75 West, Salt Lake City, Utah 84107

[22] Filed: Mar. 12, 1970

[21] Appl. No.: 18,935

[52] U.S. Cl. ......................... 298/22 R, 214/38 BA, 298/1 A
[51] Int. Cl. ........................................................ B60p 1/16
[58] Field of Search ................... 298/22 R, 1 A; 214/38 BA; 187/8.41

[56] References Cited

UNITED STATES PATENTS

| | | | |
|---|---|---|---|
| 2,070,960 | 2/1937 | Phillips | 187/8.41 |
| 2,689,965 | 9/1954 | Fenton | 214/38.22 X |

FOREIGN PATENTS OR APPLICATIONS

| | | | |
|---|---|---|---|
| 930,163 | 7/1963 | Great Britain | 298/22 |

OTHER PUBLICATIONS

Kässbohrer, German printed application No. 1,207,221 12/1965

Primary Examiner—Richard J. Johnson
Attorney—B. Deon Criddle

[57] ABSTRACT

A dumping system wherein a pneumatic bag pivotally lifts a bed and the bag expansion results from use of vehicle exhaust. In a preferred form, a dumping unit is adapted to be placed on and removed from an existing truck bed to provide a dumping vehicle and in another preferred form the dumping bed pivot can be raised and lowered whereby items can be slid into or out of the dumping bed.

10 Claims, 6 Drawing Figures

Patented May 2, 1972
3,659,899
2 Sheets-Sheet 1
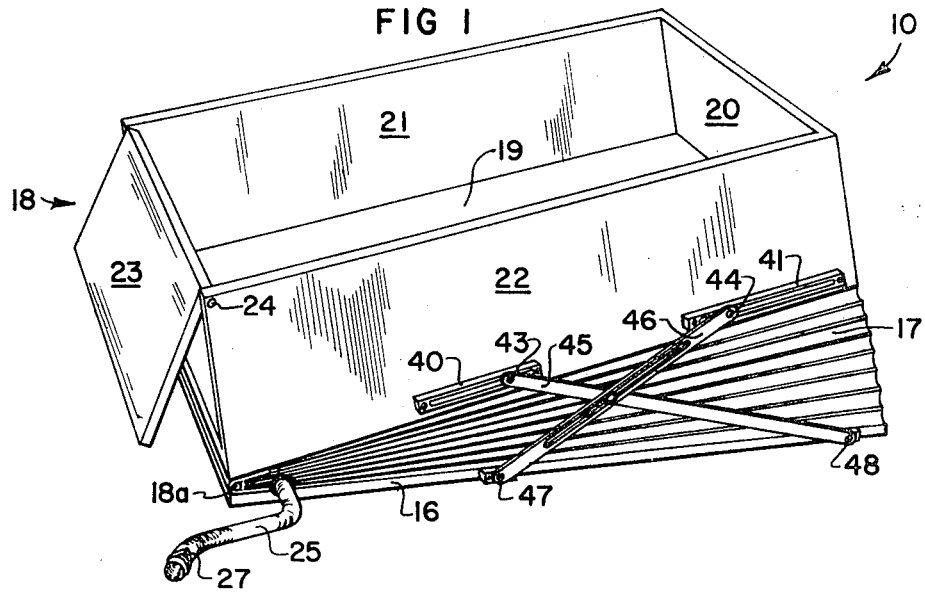
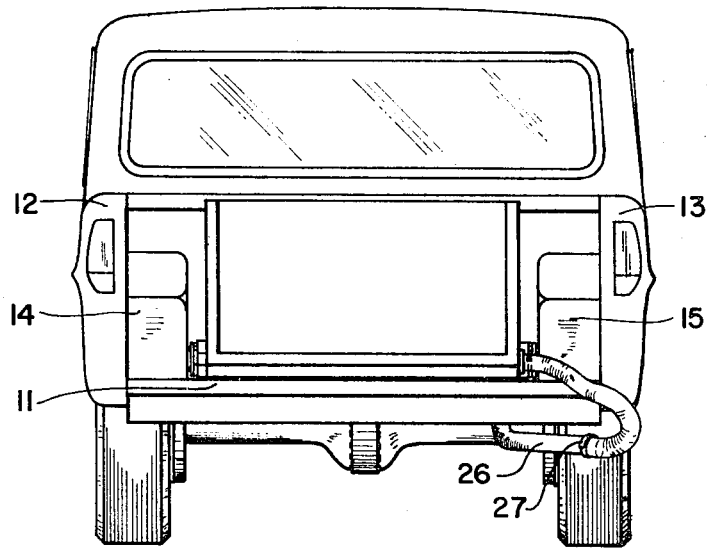
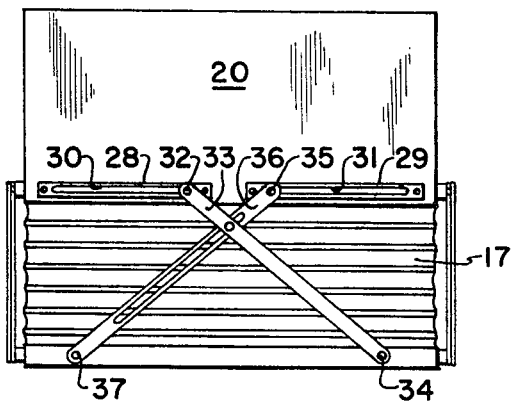
INVENTORS:
RALPH L. PHILLIPS
JOHN BALLOU
BY:
ATTORNEY Patented May 2, 1972

INVENTORS:
RALPH L. PHILLIPS
JOHN BALLOU
BY:
B. Dean Fielder

ATTORNEY

DUMP SYSTEM

BRIEF DESCRIPTION OF THE INVENTION

1. Prior Art

It has long been known to pivot a permanently mounted vehicle bed at its rear end and to provide motor means, which may be electrical, hydraulic or pneumatic, for example, to raise the bed about the pivot connection to dump a load carried on the bed. It has also been known in the past to utilize an inflatable bag means for such purpose.

2. Summary of the Invention

However, to our knowledge, there has not heretofore been a low cost, easily handled unit for converting conventional solid truck beds, and particularly the beds of pickup trucks, into dumping beds, when, on occasion, the operator of a solid bed truck may desire to have a dump bed.

It is therefore, a principal feature of the present invention to provide a unit that can be readily available, either because it is owned by the operator of a solid bed vehicle or because it is rented to him from a rental supply source, that will convert his solid bed truck into a dump truck.

Other features are to provide such a unit that is durable, one that is easily built at a relatively low cost in comparison with other available, permanently installed type dump units and one that is adaptable for use on all kinds and makes of trucks.

Also, to our knowledge, there has not heretofore been developed a dump bed unit that can be used with a loading dock having the same type of lift mechanism to provide for easy sliding of goods from the dump bed onto a dock and from the dock into the dump bed.

It is, therefore, an object of the present invention to provide a dump system including a dump unit for mounting on a fixed vehicle bed and a pivoted loading dock, and with both the dump bed of the dump unit and the loading dock being powered by vehicle exhaust and with an expansible bag as the motor means.

Principal features of the invention include a supporting bed or frame overlaid by a gas impervious bag and a dump bed, pivoted at one end to the supporting bed or frame and stabilized at the other end and hose means adapted to connect the inside of the bag to a vehicle exhaust system.

In one form the pivot connection between the supporting bed or frame and the dump bed is made movable so that the dump bed will be above a raised loading dock section and will be below the same loading dock section when the dock section is lowered.

Other objects and features of the invention will become apparent from the following detailed description and claims.

THE DRAWINGS

In the drawings:

FIG. 1 is a perspective view of a dump unit of the invention;

FIG. 2, a front elevation view;

FIG. 3, a rear elevation view of the unit of FIGS. 1 and 2 mounted in a pickup truck;

FIG. 4, a rear perspective of a truck, with its rear fenders and sides removed for clarity and with a dump unit thereof, the dumping bed being in its lowered and a convertor pump position for use position;

FIG. 5, a view like that of FIG. 4, but with the dump bed raised; and

FIG. 6, a perspective view of a movable dock section portion of the dump system invention.

DETAILED DESCRIPTION

Figure 4:
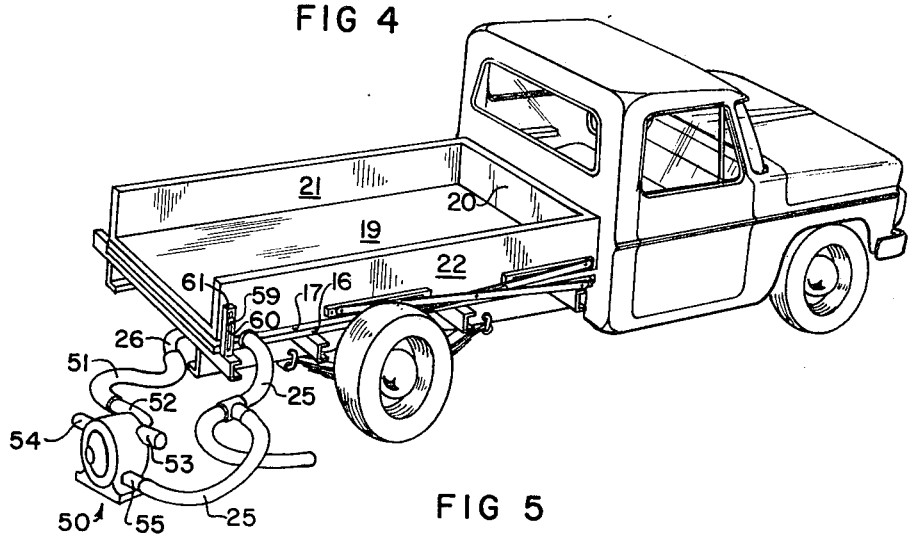

Referring now to the drawings:

In the illustrated preferred embodiment as shown in FIGS. 1-3, the dumping system includes a dumping unit shown generally at 10 and arranged to be carried on the bed 11, FIG. 2, of a pickup truck and between the side walls 12 and 13 and rear wheel wells 14 and 15 of the truck.

The dumping unit includes a supporting bed or platform 16, that may be solid, but that is preferably made of lightweight materials and that can be of mesh or other semi-open construction. In any event, the platform 16 must provide a sufficiently closed and broad support area for a gas impervious, durable but flexible bag 17. The bag 17 may be made of Neoprene or other suitable material, for example.

A dump bed 18 is mounted above the bag 17 and is pivotally connected at its rear end, as by a hinge 18a, to the platform 16.

The dump bed then further includes a floor 19, an upstanding front wall 20 and side walls 21 and 22, connected to the front wall and also upstanding from the floor 19.

If desired, a swinging tailgate 23 can also be provided, as shown in FIG. 1. The tailgate can be attached in conventional fashion, but may be pivotally connected by a rod 24 to the side walls. Also, if desired, a conventional lock arrangement, not shown, can be provided to secure the tailgate closed, except during dumping operations.

Bag 17 has a flexible hose 25 extending from the interior thereof such that it can be attached to an exhaust pipe 26 of the truck and a clamp 27 on the end of the hose provides a means whereby the hose can be removably secured in place on the exhaust pipe.

As best seen in FIG. 2, slideways 28 and 29, having slots 30 and 31, respectively, are mounted on the front wall 20, as by welding and the like.

A roller 32 is arranged to be guilded in slot 30 and is journaled at one end of a rod 33, the other end of which is pivotally connected at 34 to the front of the platform 16.

Similarly, another roller 35, arranged to be guided in slot 31, is journaled at one end of another rod 36, the other end of which is pivotally connected at 37 to the front of platform 16. The roller 35 and the pivot connection 37 are extended so that rod 36 will clear rod 33 during operation of the dump unit.

If desired, additional stability can be obtained by mounting controllers at each side of the dumping unit, as shown in FIG. 1. As there illustrated, a pair of slideways 40 and 41 are mounted on the side wall 22 to receive rollers 43 and 44 each of which are respectively journaled on the ends of rods 45 and 46. The rods 45 and 46 are respectively journaled at 47 and 48 to the platform 16, and the roller 44 and journal 47 are extended to allow rod 46 to move freely past rod 45.

As will be apparent, the use of the controllers at the sides of the dump unit is optional and is determined by such factors as the size of the unit and the amount of lift necessary for dumping.

In use, the dumping unit is picked up and placed on a truck bed between the wheel wells, and with the platform 16 preferably extending slightly rearwardly beyond the back end of the truck bed. When it is desired to lift the dump bed, the hose 25 is placed over the vehicle exhaust pipe and is clamped securely in place. The vehicle engine is started and the exhaust gasses are directed into bag 17. Even the low pressures developed at the exhaust, when applied to the interior of the bag and acting on a large surface area will readily expand the bag, thereby causing the floor 19 to pivot about hinge 18a and dumping material from the dumping bed through tailgate 23.

To lower the bed of the dumping unit, the hose 25 is disconnected from the exhaust pipe 26.

Figure 5:
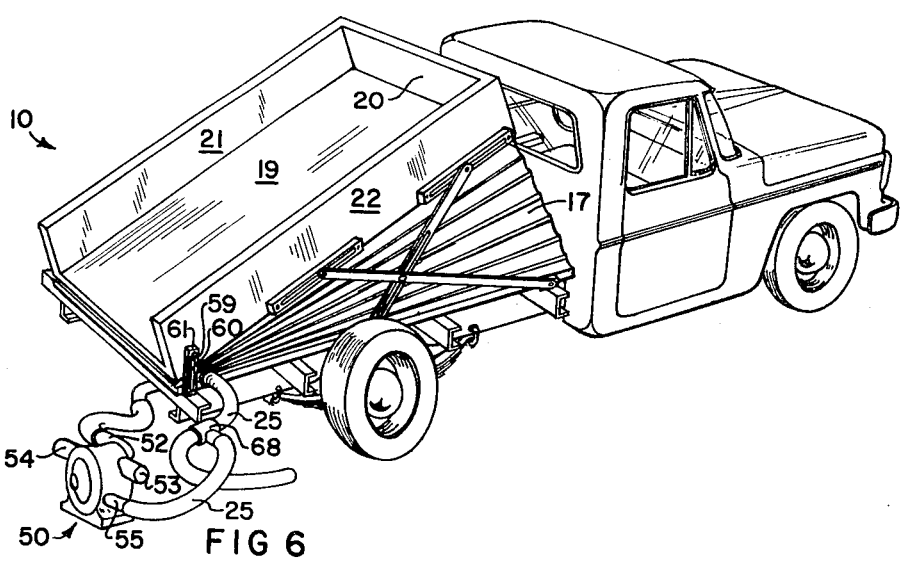

As shown in FIGS. 4 and 5, a convertor pump 50 can be used, if desired, to eliminate the explosive potential and breathing hazards incident the use of exhaust gasses directly into the expansible bag. In this case a flexible hose 51 connects the exhaust pipe and the intake 52 of the pneumatic powered pump 50. The exhaust gasses impinge on a rotor, not shown, turning the rotor and escaping out outlet 53. The turning of the rotor turns an impeller in a separate chamber, also not shown, to pull air in through intake 54 and to direct it out through outlet 55 and flexible hose 25 and into bag 17.

As best seen in FIG. 5, it is also possible to provide a valve 68 in the hose 25 so that the hose can be left connected to either the exhaust pipe or the convertor pump 50, but with flow to the bag and from the bag to the atmosphere controlled by the valve.

In FIGS. 4 and 5, the structure of the dump unit is the same as previously described, except that the hinge 18a is replaced by pins 59, projecting out from the side walls 21 and 22 and into slot 60 in upstanding guides 61, fixed to the platform 16. The pins 59 and slots 60 allow the floor 19 to move upwardly in response to expansion of the bag 17 before pivoting begins. Thus the bed does not pivot until the pins 59 have engaged the tops of the slots 60, and when the air is exhausted from the bag the floor 19 will settle back down and the pins 59 will slide downwardly in the slots 60.

Figure 6:
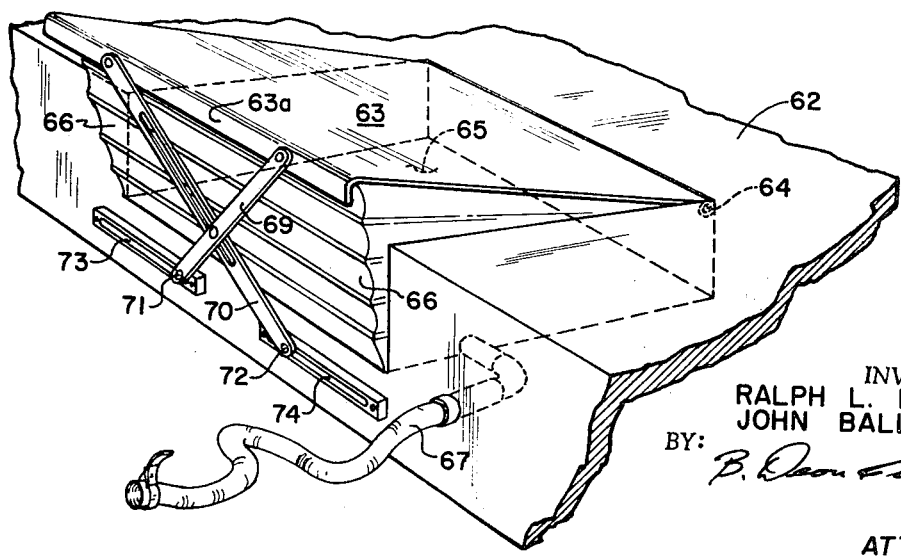

The dumping unit can thus be used with a loading dock such as is shown in FIG. 6, to provide for self loading or unloading of the dump unit.

The loading dock includes the usual loading platform 62, but with a section 63 removed and hingedly attached thereto at 64. A floor 65 is provided beneath the section 51 and a collapsible, gas impervious bag 66 such as has been previously described is placed on the floor, beneath the section 63. A flexible hose 67 then extends from the inside of the bag out through a front wall of the loading platform 62 so that it can be connected to a vehicle exhaust pipe or to a by-pass connector such as is shown at 68 in FIG. 5, in the hose connecting the bag of a dump unit with the exhaust pipe of the dump truck.

In any event, exhaust gasses forced under pressure into bag 66 will expand the bag to raise the section 63 about its hinge connection 64.

The front edge 63a of section 63 is preferably slightly downturned to provide a bumper, even when the section is raised and to provide means whereby rods 69 and 70 can be pivotally secured to the section. The rods are crossed and their opposite ends have rollers 71 and 72 thereon that are guided within slots formed in slideways 73 and 74 respectively. The roller 71 and the pivot connection of rod 70 are extended to allow the rod 70 to readily clear rod 69 during raising and lowering of section 63, and the crossed rods thus provide stability to the section 63 as it is raised and lowered and additionally hold the bag 66 in place.

To use the entire dumping system, the dump unit 10 is placed on the truck bed and is loaded. The truck is then backed to the loading dock and the truck exhaust is connected to the bag 17 of the dump unit through hose 25 and to the bag 66, through hose 67 and by-pass 68. This expands both bags and raises the floor 19 of the dump bed at an angle and such that it is essentially a continuation of the angle formed by raised section 63 of the loading dock. Material in the dump bed thus slides out and down section 63 onto the loading dock.

A reverse procedure can be followed in moving articles down the section 63, when the bag 66 is compressed and onto the dump bed, which drops when the bag 17 is compressed to a point below the front edge of the section 63.

Thus, little effort is required to unload the dump bed onto a loading platform 62 or to load the dump bed from such a loading platform, when the loading platform has a movable section to cooperate with the dump bed.

The expansible bags here described are preferably of bellows type configuration so that they will contract neatly when gasses are exhausted therefrom.

Although preferred forms of our invention have been herein disclosed, it is to be understood that the present disclosure is by way of example and that variations are possible without departing from the subject matter coming within the scope of the following claims, which subject matter we regard as our invention.

We claim:

1. In combination,
a truck having a fixed bed thereon and an engine exhaust pipe;
a dumping unit comprising
    a platform resting on the fixed bed;
    a load bed including a bottom and upstanding side walls and an end wall interconnecting said side walls;
    hinge means interconnecting the platform and the load bed at an end opposite the end wall;
    a collapsible gas impervious bag positioned between the platform and the load bed;
    hose means extending from the interior of the bag outwardly thereof and connected to an exhaust pipe of the truck; and
    means for stabilizing the load bed as it pivots about the hinge means, said means also holding the bag in position between the platform and the load bed.

2. The combination of claim 1, further including
a convertor pump connected between the hose means and the vehicle exhaust pipe, whereby the exhaust through the pipe drives the convertor pump to supply fresh air to the interior of the bag.

3. The combination of claim 1, wherein the means for stabilizing the load bed includes
a pair of crossed rods interconnecting the platform and the load bed;
means journaling one end of each rod;
a slotted slideway at the other end of the rod; and
roller means carried by each of said rods and arranged to travel in a slot of a slideway.

4. A dumping system comprising
a truck;
a load bed thereon;
an expansible gas impervious bag beneath the load bed;
a loading dock having a pivotable platform section;
an expansible gas impervious bag beneath the platform section;
means for releasably coupling each of said bags to the exhaust pipe of the truck; and
means for moving one end of the load bed up to the top of the raised pivotable platform section and for thereafter holding said one end as the load bed is pivoted therearound.

5. A dumping system as in claim 4, further including
a convertor pump connected between the hose means and the vehicle exhaust pipe, whereby the exhaust through the pipe drives the convertor pump to supply fresh air to the interior of the bag.

6. A dumping system as in claim 4, wherein the truck has a fixed bed thereon;
the load bed is positioned above a platform resting on the fixed bed and is connected to the platform by pins projecting into vertically slotted posts that extend upwardly from the platform; and
the expansible, gas impervious bag beneath the load bed is positioned on the platform.

7. A dumping system as in claim 6, wherein
means are provided for holding the expansible, gas impervious bags in place and for stabilizing the pivotable platform section of the loading dock and the load bed as they are moved.

8. A dumping unit comprising
a platform having a front, rear and sides;
a load bed having a front, rear and sides;
hinge means interconnecting the rear of the platform and the rear of the load bed;
a collapsible, gas impervious bag positioned between the platform and the load bed;
stabilizing means interconnecting the sides of the platform with the sides of the load bed, said means being movable to allow for separation of the load bed from the platform and serving as retaining means to hold the bag between the platform and the load bed; and
hose means extending from the interior of the bag outwardly thereof, whereby said hose means can be connected to a source of gas under pressure.

9. A dumping unit as in claim 7, wherein the means for stabilizing the unit includes
a pair of crossed rods interconnecting the platform and the load bed;
means journaling one end of each rod;
a slotted slideway at the other end of the rod; and roller means carried by each of said rods and arranged to travel in a slot of a slideway.

10. A dumping unit comprising
a platform;
a load bed positioned above the platform means pivotally connecting the load bed to rotate at one end thereof above the platform;
a collapsible, gas impervious bag positioned between the platform and the load bed;
hose means extending from the interior of the bag outwardly thereof, whereby said hose means can be connected to a vehicle exhaust pipe; and
a convertor pump connected between the hose means and the vehicle exhaust pipe, whereby the exhaust through the pipe drives the convertor pump to supply fresh air to the interior of the bag.

* * * * *